United States Patent
Wang et al.

(10) Patent No.: US 9,722,947 B2
(45) Date of Patent: Aug. 1, 2017

(54) MANAGING TASK IN MOBILE DEVICE

(71) Applicant: International Business Machines Corporation, Armonk, NY (US)

(72) Inventors: Yu Wang, Shanghai (CN); Chao Xue, Beijing (CN); Junchi Yan, Shanghai (CN); Baohua Yang, Beijing (CN); Fan Yang, Beijing (CN); Yue Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/948,572

(22) Filed: Nov. 23, 2015

(65) Prior Publication Data
US 2016/0150517 A1 May 26, 2016

(30) Foreign Application Priority Data
Nov. 26, 2014 (CN) .......................... 2014 1 0698576

(51) Int. Cl.
*H04W 72/00* (2009.01)
*H04L 12/911* (2013.01)
(Continued)

(52) U.S. Cl.
CPC .......... *H04L 47/70* (2013.01); *H04L 67/1002* (2013.01); *H04L 47/823* (2013.01);
(Continued)

(58) Field of Classification Search
CPC ..... H04W 47/70; H04W 47/72; H04W 47/74; H04W 47/76; H04W 47/78;
(Continued)

(56) References Cited

U.S. PATENT DOCUMENTS

| 6,400,966 B1* | 6/2002 | Andersson | ............ | H04W 88/08 |
| | | | | 370/337 |
| 8,781,490 B2* | 7/2014 | Zhu | ........................ | H04L 5/003 |
| | | | | 455/452.1 |

(Continued)

FOREIGN PATENT DOCUMENTS

CN 103235323 A 8/2013

OTHER PUBLICATIONS

Karim Habak et al., COSMOS: Computation Offloading as a Service for Mobile Devices, MobiHoc '14 Proceedings of the 15th ACM international symposium on Mobile ad hoc networking and computing, 2014, 287-296, ACM, New York, NY. http://dl.acm.org/citation.cfm?id=2632958.

(Continued)

*Primary Examiner* — Jean Gelin
(74) *Attorney, Agent, or Firm* — Cantor Colburn LLP; Mercedes Hobson

(57) ABSTRACT

A method and an apparatus for managing task in mobile device. The method includes estimating a first amount of resources that will be consumed by the mobile device in executing the task; determining network configuration that is allocable to the mobile device; estimating a second amount of resources that will be consumed by the mobile device when a computing node in a mobile computing environment executes the task under the network configuration; and determining that the task is to be executed by the mobile computing environment in response to the second amount being less than the first amount by a predefined threshold.

18 Claims, 8 Drawing Sheets

(51) Int. Cl.
*H04L 29/08* (2006.01)
*H04W 24/00* (2009.01)
*H04W 24/02* (2009.01)
*H04W 28/16* (2009.01)

(52) U.S. Cl.
CPC .......... *H04W 24/00* (2013.01); *H04W 24/02* (2013.01); *H04W 28/16* (2013.01)

(58) Field of Classification Search
CPC ......... H04W 67/1002; H04W 67/1004; H04W 67/1025; H04W 67/1029; H04W 67/1036; H04W 67/1038
USPC ......... 455/451, 452.1, 452.2, 453, 450, 445, 455/550.1, 552.1, 522
See application file for complete search history.

(56) References Cited

U.S. PATENT DOCUMENTS

| | | | |
|---|---|---|---|
| 2008/0057971 A1* | 3/2008 | Kim | H04W 52/34 455/450 |
| 2009/0154403 A1* | 6/2009 | Niwano | H04W 52/282 370/329 |
| 2011/0307573 A1 | 12/2011 | Lingafelt et al. | |
| 2012/0044828 A1* | 2/2012 | Seo | H04B 7/15521 370/252 |
| 2012/0188956 A1* | 7/2012 | Dong | H04W 72/1284 370/329 |
| 2012/0278431 A1 | 11/2012 | Luna | |
| 2012/0324259 A1 | 12/2012 | Aasheim et al. | |
| 2013/0205158 A1 | 8/2013 | Lin et al. | |
| 2013/0290755 A1 | 10/2013 | Wolman et al. | |
| 2014/0045485 A1 | 2/2014 | Jain et al. | |
| 2014/0095695 A1 | 4/2014 | Wang | |
| 2014/0136662 A1 | 5/2014 | Chan et al. | |

OTHER PUBLICATIONS

Esa Hyytia et al., Optimizing Offloading Strategies in Mobile Cloud Computing, 1-9. https://www.netlab.tkk.fi/u/esa/pub/files/hyytia-tr-offloading-2013.pdf.

Sergio Barbarossa et al., Computation Offloading for Mobile Cloud Computing Based on Wide Cross-Layer Optimization, Future Network and Mobile Summit (FutureNetworkSummit), Jul. 3-5, 2013, 1-10, IEEE, Lisboa, Portugal. http://ieeexplore.ieee.org/xpl/articleDetails.jsp?tp=&arnumber=6633543&url=http%3A%2F%2Fieeexplore.ieee.org%2Fiel7%2F6619546%2F6633516%2F06633543.pdf%3Farnumber%3D6633543.

Henri Bal et al., Cuckoo: A Computation Offloading Framework for Smartphones, Mobile Computing, Applications, and Services, 2012, 59-79, 76, Springer Berlin Heidelberg, Heidelberg, Germany. http://link.springer.com/chapter/10.1007/978-3-642-29336-8_4.

Afnan Fahim et al., Making the Case for Computational Offloading in Mobile Device Clouds, MobiCom '13 Proceedings of the 19th annual international conference on Mobile computing & networking, 2013, 203-205, ACM, New York, NY. http://dl.acm.org/citation.cfm?id=2504576.

Karthik Kumar et al., Cloud Computing for Mobile Users: Can Offloading Computation Save Energy?, Computer, Apr. 8, 2010, 51-56, 43(4), IEEE. http://ieeexplore.ieee.org/xpl/articleDetails.jsp?arnumber=5445167&tag=1.

* cited by examiner

MANAGING TASK IN MOBILE DEVICE

CROSS-REFERENCE TO RELATED APPLICATION

This application claims the benefit of priority from Chinese Patent Application 201410698576.X, filed Nov. 26, 2014, the contents of which are incorporated herein by reference.

FIELD OF THE INVENTION

Various embodiments of the present invention relate to task management, and more specifically, to a method and apparatus for managing a task in a mobile device.

BACKGROUND

With the development of cloud computing environment, computing devices join the cloud computing environment and become computing nodes in the cloud computing environment. Computing nodes are no longer limited to conventional computing devices like personal computers, but can include mobile devices (e.g., mobile phones, etc.) that access the cloud computing environment wirelessly. In this case, due to participation of a large amount of mobile devices, the conventional cloud computing environment gradually evolves into a mobile computing environment.

Due to its small size, the mobile device is rather limited in various respects such as computing resources, storage resources, power supply resources and the like. When a task requiring more resources is executed on the mobile device, it will levy a heavy burden on the mobile device and even deplete various resources of the mobile device.

Since mobile devices can access various resources in the mobile computing environment via a wireless network, it is desirable to upload a task that used to be executed on the mobile device to the mobile computing environment, execute the uploaded task by virtue of powerful resources in the mobile computing environment, and return a result of the task to the mobile device. In this way, the amount of resources consumed in the mobile device can be reduced greatly, and running of the mobile device is facilitated.

Unlike transmitting data between the computing node and the cloud computing environment via a conventional wired network, the mobile device is connected to the mobile cloud computing environment via a wireless network. Thus, the transmitting data between the mobile device and the mobile cloud computing environment via a wireless network will be subject to more restrictions. Therefore, more factors have to be considered regarding how to judge whether there is a need to upload a task in the mobile device to the mobile cloud computing environment. Existing approaches to offloading a task in a conventional computing node to the cloud computing environment are not applicable to task management in the mobile cloud computing environment and the mobile device.

SUMMARY OF THE INVENTION

Therefore, it is desirable to develop a technical solution capable of accurately judging whether to upload a task in a mobile device to a mobile cloud computing environment, and it is desired the technical solution can take into consideration attribute information of the mobile device per se and attribute information of a wireless network where the mobile device is located. Further, it is desirable to determine whether the to-be-processed task is processed by the mobile device or the mobile cloud computing environment, so as to achieve the object of reducing the amount of resources in the mobile device.

In one embodiment of the present invention, provided is a method for managing a task in a mobile device, including: estimating a first amount of resources that will be consumed by the mobile device in executing the task; determining network configuration that is allocable to the mobile device; estimating a second amount of resources that will be consumed by the mobile device when a computing node in a mobile computing environment executes the task under the network configuration; and determining that the task is to be executed by the mobile computing environment in response to the second amount being less than the first amount by a predefined threshold.

In another embodiment of the present invention, provided is an apparatus for managing a task in a mobile device, including: a first estimating module configured to estimate a first amount of resources that will be consumed by the mobile device in executing the task; a determining module configured to determine network configuration that is allocable to the mobile device; a second estimating module configured to estimate a second amount of resources that will be consumed by the mobile device when a computing node in a mobile computing environment executes the task under the network configuration; and a deciding module configured to determine that the task is to be executed by the mobile computing environment in response to the second amount being less than the first amount by a predefined threshold.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
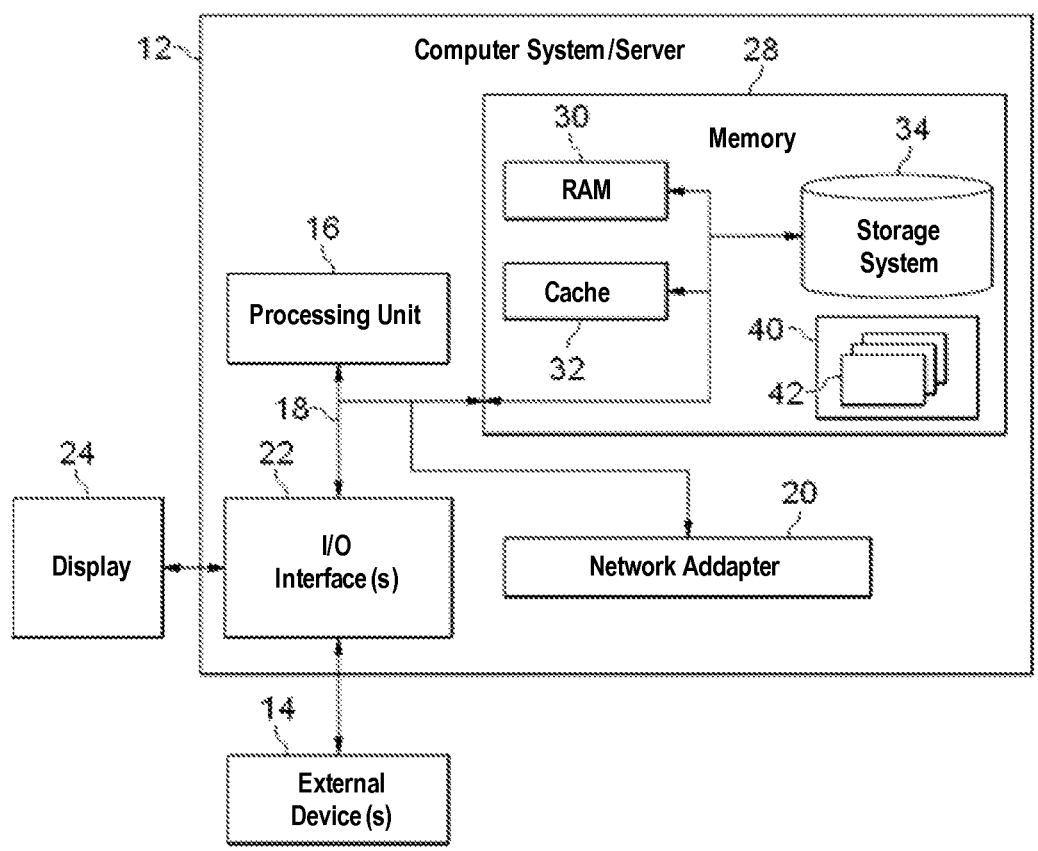
FIG. 1 schematically depicts an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. For the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is an example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and allocated cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents at least one of any several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
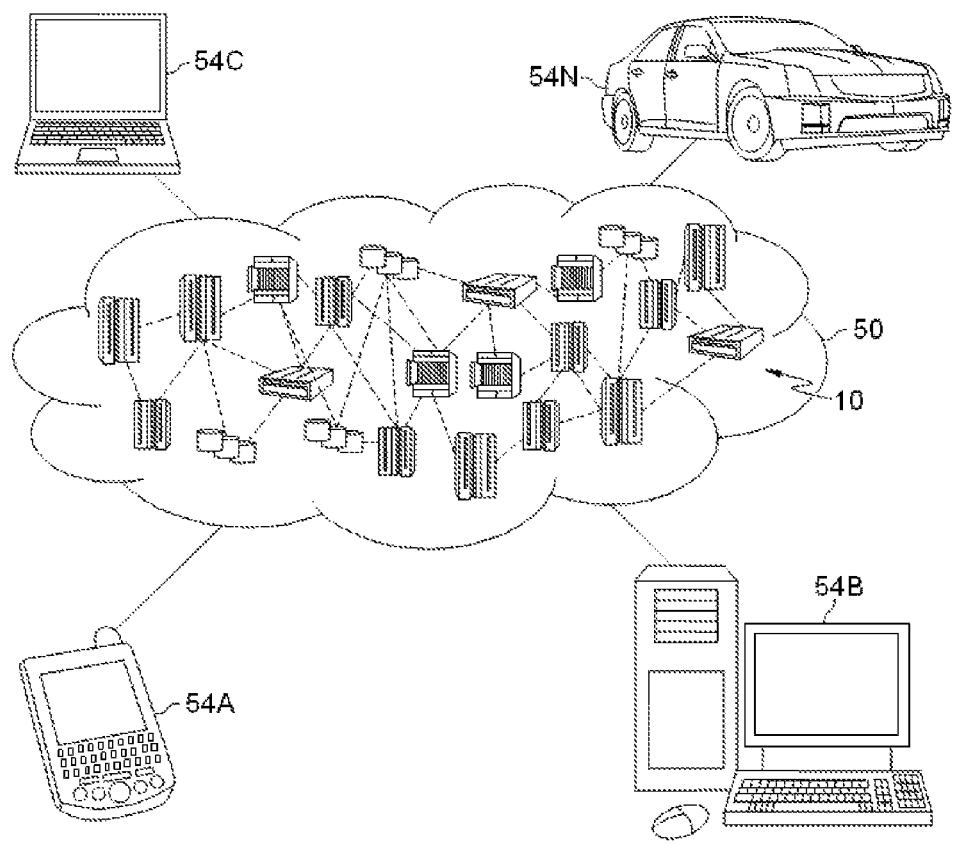
FIG. 2 schematically depicts an exemplary cloud computing environment.

Referring now to FIG. 2, an illustrative cloud computing environment 50 is depicted. As shown, the cloud computing environment 50 includes one or more cloud computing nodes 10 with which local computing devices used by cloud consumers can communicate. The local computing devices can be, for example, personal digital assistant (PDA) or cellular telephone 54A, desktop computer 54B, laptop computer 54C, and/or automobile computer system 54N. The cloud computing nodes 10 can communicate with one another. The cloud computing nodes 10 can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
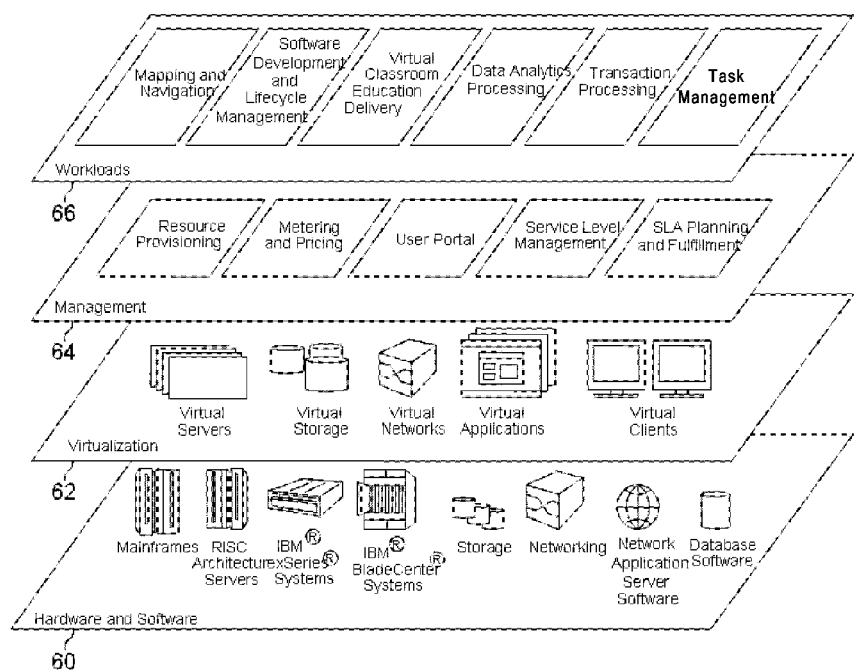
FIG. 3 schematically depicts a set of abstraction model layers provided by a cloud computing environment 50 (FIG. 2)

Referring now to FIG. 3, a set of functional abstraction layers provided by cloud computing environment 50 (FIG. 2) is shown. It should be understood first that the components, layers, and functions shown in FIG. 3 are intended to be illustrative only and embodiments of the invention are not limited thereto. As depicted, the following layers and corresponding functions are provided below.

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g, IBM DB2® database software). IBM zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. These resources can include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and task management.

In the context of the present invention, various embodiments of the present invention will be described by taking the mobile cloud computing environment as a specific example of the mobile computing environment. Those skilled in the art should understand the mobile computing environment of the present invention can include any computing environment based on a wireless network connection.

In the mobile cloud computing environment, the mobile device can be connected to the cloud via a base station and make use of processing capabilities of various computing nodes in the cloud. Generally, the processing capacity, storage capacity and power supply capacity of the mobile device are all limited. Therefore, it is wise to consider uploading tasks requiring larger processing capacity, storage capacity or power consumption to the cloud for execution by a computing node in the cloud. When the computing node completes the task, a processing result is sent back to the mobile device, whereby the object of saving resource consumption in the mobile device is achieved.

So far there have been proposed technical solutions for sending tasks at a computing device with limited resources to the cloud end for parallel processing and receiving processing results from the cloud. However, those technical solutions fail to consider complex wireless network environmental status which the mobile device might be confronted with, and are only applicable to computing devices connected in wired manner, so those existing technical solutions cannot be migrated to the mobile cloud computing environment.

Hereinafter, how to implement the technical solution of the present invention will be described by means of an application "play chess". Note in the application "play chess", a user and an application on the mobile device move chess pieces in turn, so the action that the application "play chess" calculates how to move pieces in each round can be referred to as a "task".

Figure 4A:
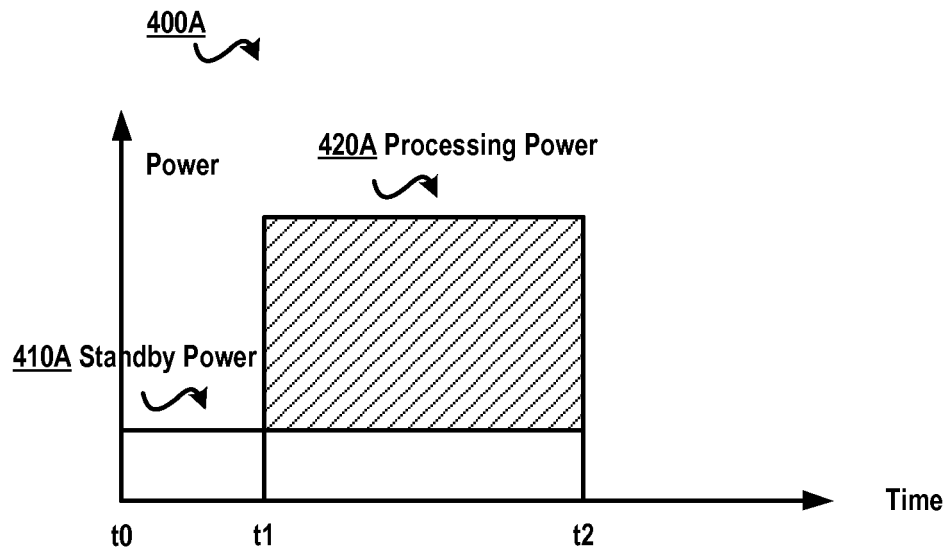
FIG. 4A schematically depicts a diagram of energy in a mobile device which will be consumed for executing a task by the mobile device according to one technical solution.

FIG. 4A schematically shows a diagram 400A of energy in a mobile device which is consumed by the mobile device in task execution. As shown in this figure, there are two types of power consumption during the interaction between the user and the application "play chess": standby power 410A, i.e., power consumption required by the mobile device to maintain normal running status, such as power consumption to maintain normal running of a module like a display (at this point, CPU is in idle state); and processing power 420A, i.e., additional power consumed by the mobile device in calculating how to move chess pieces, at this point CPU switches from idle state to occupied state.

Portion 420A shown in shadow in FIG. 4A schematically shows processing power. During t0-t1, the user ponders and moves a piece, at which point power consumption of the mobile device only involves standby power; during t1-t2, the application calculates how to move a piece, at which point power of the mobile device includes standby power and processing power. Note processing power is far greater than standby power, so electricity consumption soars during t1-t2. Note FIG. 4A only schematically shows power consumption in one round when playing chess, whereas in actual application environment, a game of chess might involve dozens and even hundreds of rounds. Thus, when the mobile device executes a calculation task, electricity consumption during playing chess will be huge.

Figure 4B:
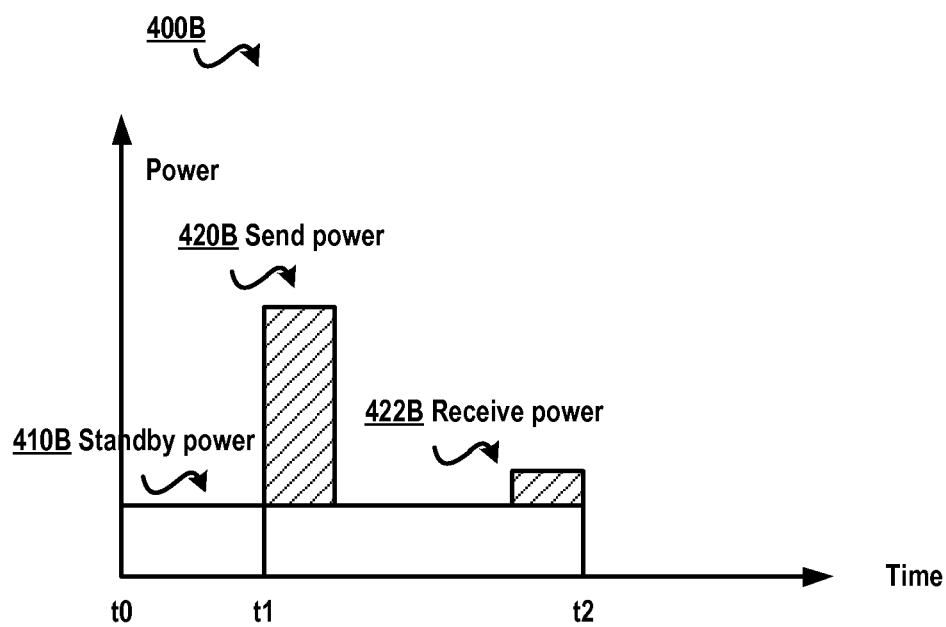
FIG. 4B schematically depicts a diagram of energy in the mobile device which will be consumed for executing the task by a computing node in the mobile cloud computing environment according to one technical solution.

In addition, FIG. 4B schematically shows a diagram 400B of energy in a mobile device which is consumed by a computing node in mobile cloud computing environment during task execution. As shown in this figure, when the computing node in the mobile cloud computing environment executes a task, the mobile device only needs to send the task to the cloud and receive a processing result therefrom. In this manner, power consumption during t0-t1 is standby power 410B; during t1-t2, the task is sent to the cloud and a result is received therefrom, at which point power consumption of the two operations is send power 420B and receive power 422B respectively. Note receive power 422B is quite small and thus can be ignored; although send power 422B is relatively large, not much energy will be consumed because in normal network conditions the duration of the sending process is short. When network conditions are bad, the sending process will last for a long time and even the mobile device has to send tasks repetitively. In this case, more energy in the mobile device will be consumed.

As shown in FIGS. 4A and 4B, by sending tasks to the cloud and receiving processing results, energy consumption of the mobile device can be reduced. Therefore, it is desirable to develop a technical solution for determining, based on current network conditions, whether to send a task to the cloud. In this technical solution, whether a computing node in the cloud or the mobile device per se executes the task, it is desirable to obtain a processing result with minimum resource consumption. Note although FIGS. 4A and 4B only depict resource consumption in the respect of power consumption, in application environment of the present invention, resource consumption can further include other respects. A description is presented below by means of specific embodiments.

Figure 5:
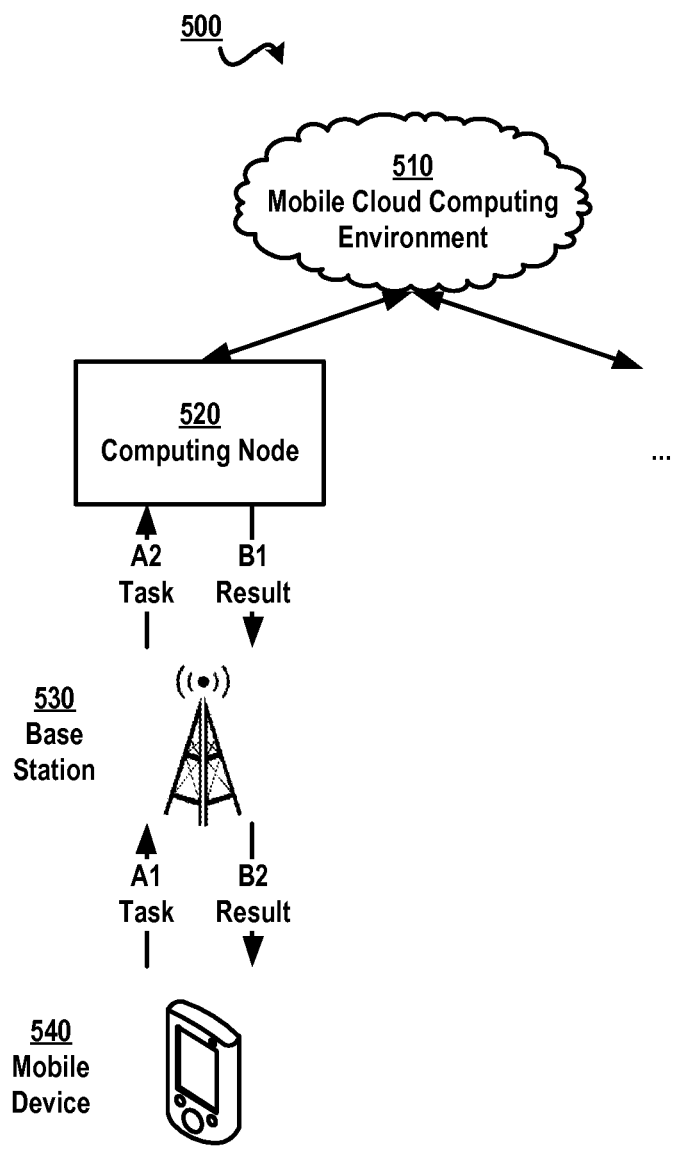
FIG. 5 schematically depicts a block diagram of a technical solution for managing a task in a mobile device according to one embodiment of the present invention.

FIG. 5 schematically shows a block diagram 500 of a technical solution for managing a task in a mobile device according to one embodiment of the present invention. As shown in FIG. 5, a base station 530 functions as an agent between a mobile device 540 and a mobile cloud computing environment, so base station 530 can conveniently know information at mobile device 540 and mobile cloud computing environment 510.

In one embodiment of the present invention, it can be judged at base station 530 whether to send a task to mobile cloud computing environment 510; if it is determined that a task needs to be sent to mobile cloud computing environment 510, then the task can be sent from mobile device 540 to a computing node 520 in the cloud via base station 530 (as shown by arrows A1 and A2), and after the task is executed by computing node 520, a processing result is returned to mobile device 540 via base station 530 (as shown by arrows B1 and B2). FIG. 5 schematically shows the interaction between one mobile device 540 and mobile cloud computing environment 510, whereas in the context of the present invention, a plurality of mobile devices can concurrently interact with mobile cloud computing environment 510.

Executing a task either by a computing node in the cloud or a mobile device per se will consume resources in the mobile device, so it is necessary to determine the amounts of consumed resources in the mobile device when a task is executed by the computing node in the cloud and by the mobile device respectively. Further, the two amounts of resources are compared to determine whether to send the task to the cloud.

Specifically, there is proposed a method for managing a task in a mobile device, including: estimating a first amount of resources that will be consumed by the mobile device in executing the task; determining network configuration that is allocable to the mobile device; estimating a second amount of resources that will be consumed by the mobile device when a computing node in a mobile computing environment executes the task under the network configuration; and determining that the task is to be executed by the mobile computing environment in response to the second amount being less than the first amount by a predefined threshold.

Figure 6:
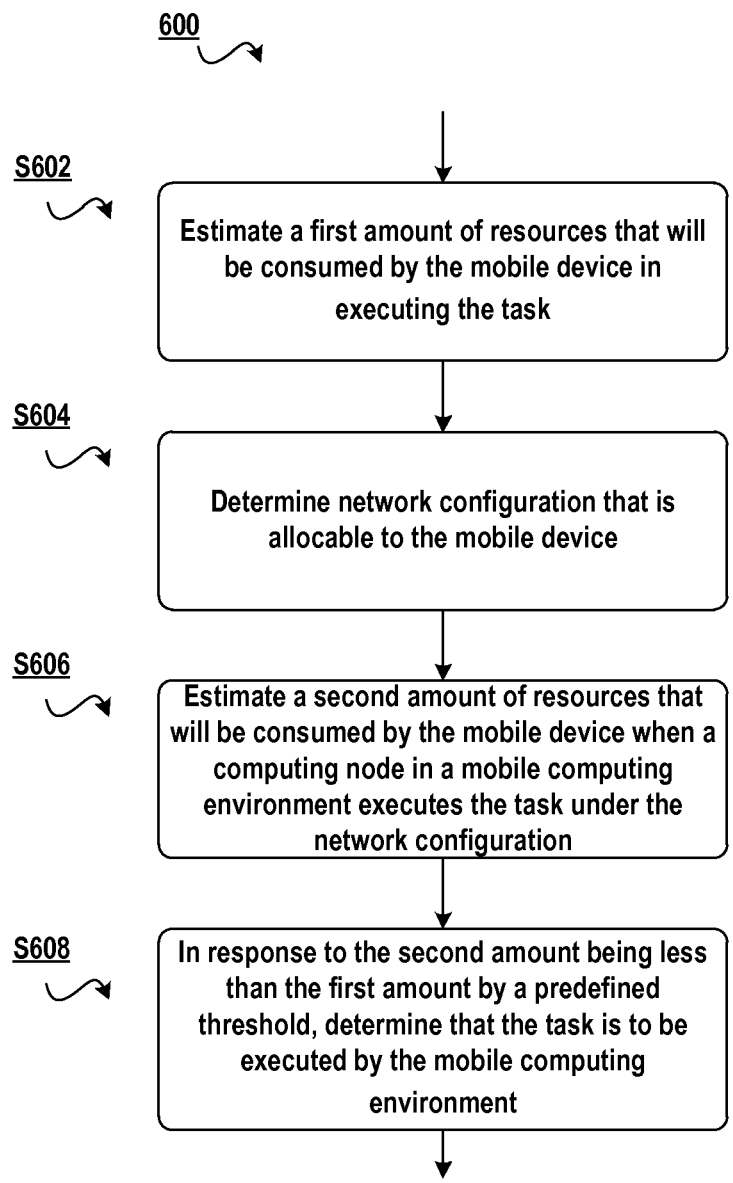
FIG. 6 schematically depicts a flowchart of a method for managing a task in a mobile device according to one embodiment of the present invention.

FIG. 6 schematically shows a flowchart 600 of a method for managing a task in a mobile device according to one embodiment of the present invention. In step S602, a first amount of resources that will be consumed by the mobile device in executing the task is estimated.

In the context of the present invention, there can be various types of resources, and corresponding estimation equations can be defined for a different type of resources. Specifically, when the type of resources is time, an average value of time used for executing each task (for example, calculating each movement of the chess pieces in the application "play chess") can be used as the amount of resource consumption in the time respect. When the type of resources is energy, the amount of resource consumption in the energy respect can be obtained based on standby power and processing power of the mobile device.

In step S404, network configuration that is allocable to the mobile device is determined. In the mobile computing environment, the mobile device communicates with the cloud via a wireless network; at this point, the amount of resources in the mobile device which will be consumed when sending the task from the mobile device to the mobile computing environment will be affected by the wireless network. Therefore, the network configuration that is allocable to the mobile device further needs to be determined. Specifically, various network communication resources are allocated to the mobile device by a base station communicating with the mobile device, the network configuration that is allocable to the mobile device can be obtained from the base station.

In step S606, a second amount of resources that will be consumed by the mobile device when a computing node in a mobile computing environment executes the task under the network configuration is estimated. Where the network configuration that is allocable currently has been determined, the amount of resources that is consumed by the mobile device when a computing node in a mobile computing environment executes the task under the network configuration can be estimated.

Like the estimation step in S602, in this step, there can be various types of resources, and corresponding estimation equations can be defined for different types of resources. Specifically, when the type of resources is time, time for sending the task to the cloud/receiving a processing result from the cloud and time for executing the task by the computing node in the cloud can be used as the amount of resource consumption in the time respect; or when the computing node in the cloud has a strong processing capacity, time for executing the task by the computing node can further be ignored. When the type of resources is energy, the amount of resource consumption in the energy respect can be obtained based on standby power and send/receive power of the mobile device.

In step S608, it is determined that the task is to be executed by the mobile computing environment in response to the second amount being less than the first amount by a predefined threshold. In this step, the amount of resources in the mobile device that will be consumed when the mobile device executes the task can be compared with the amount of resources in the mobile device that will be consumed when the computing node in the cloud executes the task, so as to determine which body is to execute the task for facilitating resource conservation in the mobile device, and subsequently the body that will save more resource consumption will be selected to execute the task.

Those skilled in the art can customize a value of the predefined threshold, and the value can be an absolute value of resource consumption or a ratio of resources consumed by different devices in executing the task. For example, in order to avoid frequent switches, it can be specified that when the second amount is 10% less than the first amount, the mobile computing environment is to execute the task. For another example, in order to save more resources of the mobile device, the predefined threshold can further be set as "0."

Specifically, the task can be sent to the cloud when the second amount is less than or equal to the first amount. Note as described in steps S602 and S606, there can be included various types of resources, so the two amounts taken under comparison in this step should be metrics with respect to the same type of resources. Specifically, when the type of resources is time, both the first amount and the second amount are amounts of resource consumption in the time respect; when the type of resources is energy, both the first amount and the second amount should be amounts of resource consumption in the energy respect.

In one embodiment of the present invention, the network configuration includes modulation information M and channel number c. Specifically, when determining network configuration that is allocable to the mobile device, modulation information M can be selected from a plurality of allocable modulation information, and channel number c can be selected from a plurality of allocable channel numbers c.

In the mobile cloud computing environment, the mobile device is connected via a base station to the computing node in the mobile cloud computing environment. Therefore, an allocable portion can be selected from the network configuration that is supported by the base station. Specifically, both modulation information and channel number are important factors that affect the network configuration, so the network configuration can be described as a two-tuple (M,c) including the modulation information M and the channel number c.

Figure 7:
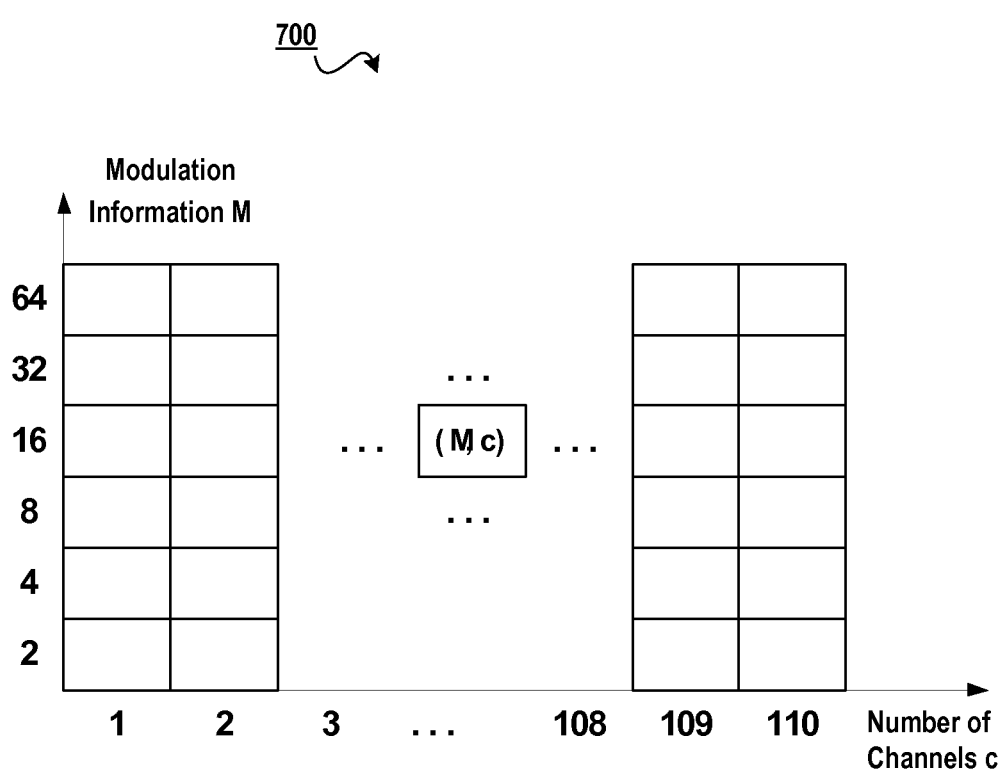
FIG. 7 schematically depicts a block diagram of a technical solution for determining network configuration that is allocable to a mobile device according to one embodiment.

Note in existing mobile communication systems, the modulation information and the channel number are predefined values. For example, the modulation information can includes types as below: 2, 4, 8, 16, 32, and 64, i.e., any value can be selected from these 6 values as the modulation information. For another example, the channel number can be any integer between 1 and 110, i.e., any integer between 1 and 110 can be used as the channel information. Therefore, 6×110=660 two-tuples can be constructed in various embodiments of the present invention. FIG. 7 schematically shows a block diagram 700 of a technical solution for determining network configuration that is allocable to the mobile device according to one embodiment of the present invention. With reference to FIG. 7, description is presented below to how to determine network configuration that is allocable to the mobile device.

As shown in FIG. 7, the horizontal axis represents the channel number, and the vertical axis represents the modulation information. Therefore, each block in a matrix as shown in FIG. 7 can represent one two-tuple (M,c) describing the network configuration. Thereby, when judging whether to send a task to the cloud, regarding each two-tuple (M,c) in FIG. 7, it can be judged whether the second amount of resources in the mobile device which will be consumed when the computing node executes the task is less than or equal to the first amount of resources in the mobile device which will be consumed by the mobile device in executing the task, and further it is determined whether the task is sent to the cloud. In this manner, as long as it is found the second amount is less than or equal to the first amount under the network configuration represented by one two-tuple (M,c), the task can be sent to the cloud without a need to perform calculation with respect to other two-tuples.

In one embodiment of the present invention, there is further included a method: instructing the computing node in the mobile computing environment to execute the task; and sending a result of executing the task to the mobile device. After the computing node in the mobile computing environment executes the task, an execution result can be sent to the mobile device. Since the mobile device only consumes quite a small resource in receiving data, resource consumption generated in receiving the result can be ignored.

In one embodiment of the present invention, the estimating a first amount of resources that will be consumed by the mobile device in executing the task includes: estimating first time consumption $T_1$ as the first amount based on processor configuration of the mobile device. The estimating a second amount of resources that will be consumed by the mobile device when a computing node in a mobile computing environment executes the task under the network configuration includes: estimating second time consumption $T_2$ as the second amount based on time for sending the task to the mobile computing environment and delay time $T_{vm}$ for executing the task by the computing node in the mobile computing environment.

In the context of the present invention, both the first amount and the second amount can be metrics of resource consumption in the time respect. Specifically, when the task is executed by the mobile device, time for executing the task is inversely proportional to the processing capacity of the processor, so time for executing the task by the mobile device can be estimated based on processor configuration of the mobile device. For example, suppose CPU of a mobile device 1 is 1.7 G with 4 processor cores while CPU of a mobile device 2 is also 1.7 G with 2 processor cores, then it can be considered that processing time of mobile device 1 is nearly half of processing time of mobile device 2.

When the computing node in the cloud executes the task, time consumption for executing the task by the computing node in the cloud can be estimated based on time for sending the task to the cloud, time for receiving a processing result from the cloud and delay time for executing the task by the computing node in the cloud.

In one embodiment of the present invention, the network configuration includes modulation information M and channel number c, and the second time consumption is estimated based on an equation $T_2=2T_{tx}(M,c)+T_{vm}$, wherein $T_{tx}(M,c)$ represents time for sending task under the network configuration (M,c), $$T_{tx}(M,c) = \frac{LT_s}{c l \log_2 M},$$

wherein L represents the number of bits of the task, $T_s$ and l are constants associated with a mobile environment where the mobile device is.

Time for sending the task will be affected by various factors, specifically, will be affected by the network configuration (for example, the two-tuple (M,c)), and further affected by the size of the task (for example, the number of bits). In one embodiment of the present invention, time for sending the task under the network configuration can be represented by an equation below:

$$T_{tx}(M,c) = \frac{LT_s}{c l \log_2 M},$$

wherein L represents the number of bits of the task, $T_s$ and l are constants, and $T_s$=0.5 ms and l=7 in a 4 G (Long Term Evolution, LTE) system.

In one embodiment of the present invention, it can be considered that time for sending the task to the cloud is approximated time for receiving a processing result from the cloud. In one embodiment of the present invention, the delay time $T_{vm}$ can be determined based on historical data regarding the computing node in the cloud executing other tasks. Specifically, in the application "play chess," if historical data indicates average time for executing one task by the computing node in the cloud is 20 ms, then the delay time can be set as $T_{vm}$=20 ms. If the delay time $T_{vm}$ is far greater than the time for sending the task to the cloud, the delay time $T_{vm}$ can further be ignored.

In one embodiment of the present invention, the estimating a first amount of resources that will be consumed by the mobile device in executing the task includes: estimating first energy consumption $P_1$ as the first amount based on processor frequency of the mobile device. The estimating a second amount of resources that will be consumed by the mobile device when a computing node in a mobile computing environment executes the task under the network configuration includes: estimating second energy consumption $P_2$ as the second amount based on standby power $P_c$ of the mobile device and sending power $P_T(M,c)$ for sending the task under the network configuration.

In one embodiment of the present invention, the first energy consumption is estimated based on an equation $P_1=Kf^2$, wherein K is a constant, and f is the processor frequency of the mobile device; and the second energy consumption is estimated based on an equation $P_2=(P_c+P_T(M,c))\cdot T_{tx}(M,c)$, wherein the sending power $$P_T(M, c) = \frac{cN_0 w(M-1)\ln(5p_e)}{-1.5g},$$

$p_e$ is the maximum error probability, g is channel gain, and $N_0$ and w are constants associated with a mobile environment where the mobile device is.

Those skilled in the art should understand since the energy consumption of the mobile device in executing a task mainly depends on the electricity consumption of the processor, the first amount of the energy consumption can be estimated based on processor frequency of the mobile device. It is found from experiments that the energy consumption of the processor is approximately proportional to the square of the processor frequency. Thereby, the first energy consumption can be estimated based on $P_1 = Kf^2$, wherein K is a constant that is determined based on empirical values.

In addition, those skilled in the art should understand since the amount of resources in the mobile device which will be consumed by the computing node in the mobile cloud computing environment for executing the task mainly depends on the energy consumption during sending the task (the energy consumption for receiving a processing result is so small as can be ignored), the second amount of the energy consumption can be estimated based on power during sending the task and time for sending the task.

In this embodiment, the power for sending the task can include two portions, namely the standby power $P_c$ and sending power $P_T(M,c)$ of the mobile device. The standby power $P_c$ of the mobile device can be obtained based on historical measured values, and the sending power $P_T(M,c)$ can be calculated based on the network configuration that is allocable to the mobile device. Specifically, calculation can be performed based on an equation as below:

$$P_T(M, c) = \frac{cN_0 w(M-1)\ln(5p_e)}{-1.5g}, \quad \text{Equation 1}$$

wherein $N_0$ and w are constants, and in the 4 G system, $N_0/2 = 10^{-12}$ W/Hz and w=180 kHz; $P_e$ is the maximum error probability, and g is channel gain. In this embodiment, the maximum error probability $p_e$ can be specified, and the channel gain g obtained through measurement, for example.

In this embodiment, the energy consumption during sending can be obtained based on the product of power consumption $(P_c + P_T(M,c))$ of the mobile device during sending times duration $T_{tx}(M,c)$ of the sending. That is, $$P_2 = (P_c + P_T(M,c)) \cdot T_{tx}(M,c) \quad \text{Equation 2}$$

In one embodiment of the present invention, the first amount is the maximum number of channels that are supported by a base station communicating with the mobile device, and the second amount is the sum of the total number of channels that are allocated by the base station to all other mobile devices and the channel number c.

Note during sending the task to the mobile cloud computing environment, consideration should be given to whether there is an available channel. Since usually the base station simultaneously communicates with a plurality of mobile devices, it is necessary to determine whether there are enough idle channels for allocation to the mobile device. Therefore, in this embodiment, suppose N mobile devices (including the mobile device that is currently running the application "play chess") are communicating with the base station and $c_i$ channels are allocated to the $i^{th}$ mobile device among the N mobile devices, then it should be ensured that the sum of channels allocated to various mobile devices is less than or equal to the total number of channels (e.g., 110). Only when the sum of channels is less than or equal to the total number of channels, can the mobile device send the task to the mobile cloud computing environment.

Figures 8, 9:
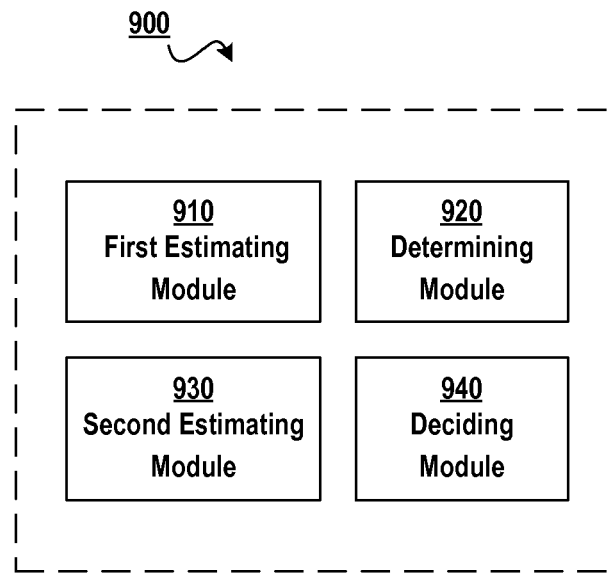
FIG. 8 schematically depicts types of resource consumption and a block diagram of judging criteria for determining whether to send a task to the mobile cloud computing environment according to one embodiment of the present invention.
FIG. 9 schematically depicts a block diagram of an apparatus for managing a task in a mobile device according to one embodiment of the present invention.

Although how to estimate the first amount and the second amount with respect to various types of resources has been described by means of different embodiments, those skilled in the art should understand these embodiments can be used separately or in combination with one another. FIG. 8 schematically shows types of resource consumption and a block diagram 800 of judgment criteria for determining whether to send the task to the mobile cloud computing environment. As shown in FIG. 8, resource consumption can include factors in three respects, i.e., time consumption, energy consumption and channel consumption.

In FIG. 8 three equations show three criteria for judging whether to send the task to the mobile cloud computing environment. For example, when resources are time, if the second amount of time (time that is spent executing the task by a computing node in the mobile cloud computing environment) is less than or equal to the first amount of time (time that is spent executing the task by the mobile device), then the task can be sent to the mobile cloud computing environment. At this point, the criterion for sending the task to the mobile cloud computing environment is:

$$2T_{tx}(M,c) + T_{vm} \leq \bar{t}_m \quad \text{Equation 3}$$

For example, when resources are energy consumption, if the second amount of energy consumption (energy that is consumed for executing the task by the computing node in the mobile cloud computing environment) is less than or equal to the first amount of energy consumption (energy that is consumed for executing the task by the mobile device), then the task can be sent to the mobile cloud computing environment. At this point, the criterion for sending the task to the mobile cloud computing environment is:

$$(P_c + P_T(M,c)) \cdot T_{tx}(M,c) \leq kf^2 \cdot \bar{t}_m \quad \text{Equation 4}$$

For example, when resources are channel consumption, if the sum of channels allocated to various mobile devices is less than or equal to the total number of channels, then the task can be sent to the mobile cloud computing environment. At this point, the criterion for sending the task to the mobile cloud computing environment is:

$$\Sigma_{i=1}^{N} c_i \leq C \quad \text{Equation 5}$$

Those skilled in the art can further use these embodiments separately or in combination with one another. For example, when the mobile device is in low battery, an embodiment that better helps to save energy in the mobile device can be selected; when it is considered time has higher importance, an embodiment that better helps to save time can be selected; or impact of time consumption, energy consumption and channel consumption can be considered comprehensively, i.e., the task is sent to the mobile cloud computing environment when the three criteria shown in Equations 3-5 are satisfied.

In one embodiment of the present invention, the method of the present invention is implemented at a base station communicating with the mobile device. Since the base station acts as an agent between the mobile device and the mobile cloud computing environment, the method of the present invention can be implemented at the base station. The computation capacity of the base station is quite strong, and it is easy to collect various parameters used for calculating the first amount and the second amount. Therefore, by implementing the method of the present invention at the base station, whether to send the task to the mobile cloud computing environment can be judged with as less consumption of various resources of the mobile device as possible.

In one embodiment of the present invention, in response to the second amount not being less than the first amount by the predefined threshold, candidate values are selected from a plurality of candidate values of the modulation information M and a plurality of candidate values of the channel number c, such that after selection the second amount is less than the first amount by the predefined threshold.

Returning to FIG. 7, the description has been presented to the plurality of candidate values (i.e., 2, 4, 8, 16, 32 and 64) of the modulation information M and the plurality of candidate values (i.e., any integer between 1 and 110) of the channel number c. Therefore, selection can be made among various two-tuples as shown in FIG. 7 one after another. Specifically, when the first two-tuple (2, 1) in the lower-left corner of FIG. 7 is selected, suppose at this point the second amount is larger than the first amount, then next network configuration can be selected from other two-tuples shown in FIG. 7. For example, a next two tuple (2, 2) can be selected along the direction shown by the horizontal axis; suppose at this point the second amount is still larger than the first amount, then a next two-tuple can be selected from other two-tuples shown in FIG. 7 until a two-tuple is found which makes the second amount less than the first amount by the predefined threshold or until all two-tuples are traversed. Those skilled in the art should understand when making search by the above method, after all two-tuples where M=2 are traversed, the flow continues to test whether each tuple where M=4, 8, 16, . . . , 64 makes the second amount less than the first amount by the predefined threshold.

Alternatively, those skilled in the art can first make search along the direction shown by the vertical axis in FIG. 7 or make search in other order, so long as a two-tuple making the second amount less than the first amount by the predefined threshold is found or until all two-tuples are traversed. In this embodiment, if no two-tuple making the second amount less than the first amount by the predefined threshold can be found, it means that more resources will be consumed if the task is executed by the computing node in the mobile cloud computing environment, so the task can be executed by the mobile device.

In one embodiment of the present invention, there is a method which includes: determining that the task is to be executed by the mobile device in response to the second amount not being less than the first amount by the predefined threshold. When the computing node in the mobile cloud computing environment will consume more resources than the mobile device in executing the task, the mobile device can locally execute the task so as to consume as less resource in the mobile device as possible.

Various embodiments implementing the method of the present invention have been described above with reference to the accompanying drawings. Those skilled in the art can understand that the method can be implemented in software, hardware or a combination of software and hardware. Moreover, those skilled in the art can understand by implementing steps in the above method in software, hardware or a combination of software and hardware, there can be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention includes several means or modules, the means or modules configured to execute corresponding steps. Upon reading this specification, those skilled in the art can understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

FIG. 9 schematically shows a block diagram 900 of an apparatus for managing a task in a mobile device according to one embodiment of the present invention. Specifically, there is proposed an apparatus for managing a task in a mobile device, including: a first estimating module 910 configured to estimate a first amount of resources that will be consumed by the mobile device in executing the task; a determining module 920 configured to determine network configuration that is allocable to the mobile device; a second estimating module 930 configured to estimate a second amount of resources that will be consumed by the mobile device when a computing node in a mobile computing environment executes the task under the network configuration; and a deciding module 940 configured to determine that the task is to be executed by the mobile computing environment in response to the second amount being less than the first amount by a predefined threshold.

In one embodiment of the present invention, the network configuration includes modulation information M and the amount c of channels.

In one embodiment of the present invention, a cloud instructing module is configured to instruct the computing node in the mobile computing environment to execute the task; and a result sending module configured to send a result of executing the task to the mobile device.

In one embodiment of the present invention, first estimating module 910 includes: a first time estimating module configured to estimate first time consumption $T_1$ as the first amount based on processor configuration of the mobile device. A second estimating module 930 includes: a second time estimating module configured to estimate second time consumption $T_2$ as the second amount based on time for sending the task to the mobile computing environment and delay time $T_{vm}$ for executing the task by the computing node in the mobile computing environment.

In one embodiment of the present invention, the network configuration includes modulation information M and channel number c, and the second time consumption is estimated based on a formula $T_2 = 2T_{tx}(M,c) + T_{vm}$, wherein $T_{tx}(M,c)$ represents time for sending task under the network configuration (M,c), $$T_{tx}(M, c) = \frac{LT_s}{c l \log_2 M},$$

wherein L represents the number of bits of the task, $T_s$ and l are constants associated with a mobile environment where the mobile device is.

In one embodiment of the present invention, first estimating module 910 includes: a first energy estimating module configured to estimate first energy consumption $P_1$ as the first amount based on processor frequency of the mobile device. A second estimating module 930 includes: a second energy estimating module configured to estimate second energy consumption $P_2$ as the second amount based on standby power $P_c$ of the mobile device and sending power $P_T(M,c)$ for sending the task under the network configuration.

In one embodiment of the present invention, the first energy consumption is estimated based on a formula $P_1=Kf^2$, wherein K is a constant, and f is the processor frequency of the mobile device; and the second energy consumption is estimated based on a formula $P_2=(P_c+P_T(M,c))\cdot T_{tx}(M,c)$, wherein the sending power $$P_T(M,c) = \frac{cN_0 w(M-1)\ln(5p_e)}{-1.5g},$$

$p_e$ is the maximum error probability, g is channel gain, and $N_0$ and w are constants associated with a mobile environment where the mobile device is.

In one embodiment of the present invention, the first amount is the maximum number of channels that are supported by a base station communicating with the mobile device, and the second amount is the sum of the total number of channels that are allocated by the base station to all other mobile devices and the channel number c.

In one embodiment of the present invention, the apparatus is implemented at a base station communicating with the mobile device.

In one embodiment of the present invention, a local instructing module is configured to determine that the task is to be executed by the mobile device in response to the second amount not being less than the first amount by the predefined threshold.

In one embodiment of the present invention, a selecting module is configured to, in response to the second amount not being less than the first amount by the predefined threshold, select candidate values from a plurality of candidate values of the modulation information M and a plurality of candidate values of the channel number c, such that after selection the second amount is less than the first amount by the predefined threshold.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

By means of the method and apparatus of the present invention, code sets can be isolated among various developers who collaborate in developing Rich Internet Applications, so that a developer can focus more on his/her own programming object without a need to care about code details of other developers.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a task in a mobile device, comprising:
   estimating a first amount of resources that will be consumed by the mobile device in executing the task;
   determining network configuration that is allocable to the mobile device;
   estimating a second amount of resources that will be consumed by the mobile device when a computing node in a mobile computing environment executes the task under the network configuration;
   in response to the second amount being less than the first amount by a predefined threshold, determining that the task is to be executed by the mobile computing environment; and
   instructing the computing node in the mobile computing environment to execute the task;
   sending a result of executing the task to the mobile device; and
   wherein estimating the first amount of resources that will be consumed by the mobile device in executing the task includes estimating first time consumption $T_1$ as the first amount based on processor configuration of the mobile device; and
   wherein estimating the second amount of resources that will be consumed by the mobile device when the computing node in a mobile computing environment executes the task under the network configuration includes estimating second time consumption $T_2$ is the second amount based on time for sending the task to the mobile computing environment and delay time $T_{vm}$ for executing the task by the computing node in the mobile computing environment.

2. The method according to claim 1, wherein the network configuration comprises:
   modulation information M; and
   number c of channels.

3. The method according to claim 2, further comprising:
   in response to the second amount not being less than the first amount by the predefined threshold, selecting candidate values from a plurality of candidate values of the modulation information M and a plurality of candidate values of the number c of channels, such that after the selecting the second amount is less than the first amount by the predefined threshold.

4. The method according to claim 1, wherein the network configuration comprises:
   modulation information M ;
   number c of channels; and
   the second time consumption $T_2$ is estimated based on an equation $T_2 = 2T_{tx}(M,c) + T_{vm}$, wherein $T_{tx}(M,c)$ represents time for sending task under the network configuration (M,c)

$$T_{tx}(M, c) = \frac{LT_s}{c l \log_2 M},$$

wherein L represents the number of bits of the task, $T_s$ and l are constants associated with a mobile environment where the mobile device is.

5. The method according to claim 4, wherein
   estimating the first amount of resources that will be consumed by the mobile device in executing the task includes estimating first energy consumption $P_1$ as the first amount based on processor frequency of the mobile device; and
   estimating the second amount of resources that will be consumed by the mobile device when a computing node in a mobile computing environment executes the task under the network configuration includes estimating second energy consumption $P_2$ as the second amount based on standby power $P_c$ of the mobile device and sending power $P_T(M,c)$ for sending the task under the network configuration.

6. The method according to claim 5, wherein
the first energy consumption $P_1$ is estimated based on an equation $P_1 = Kf^2$, wherein K is a constant, and f is the processor frequency of the mobile device; and
the second energy consumption $P_2$ is estimated based on a formula $P_2 = (P_c + P_T(M,c)) \cdot T_{tx}(M,c)$, wherein the sending power $$P_T(M,c) = \frac{cN_0 w(M-1)\ln(5p_e)}{-1.5g},$$

Pe is the maximum error probability, g is channel gain, and $N_0$ and w are constants associated with a mobile environment where the mobile device is.

7. The method according to claim 2, wherein
the first amount is the maximum number of channels that are supported by a base station communicating with the mobile device; and
the second amount is the sum of the total number of channels that are allocated by the base station to all other mobile devices and the number c of channels.

8. The method according to claim 1, wherein the method is implemented at a base station communicating with the mobile device.

9. The method according to claim 1, further comprising:
in response to the second amount not being less than the first amount by the predefined threshold, determining that the task is to be executed by the mobile device.

10. An apparatus for managing a task in a mobile device, comprising:
a processor communicatively coupled to a memory, the processor configured to:
estimate a first amount of resources that will be consumed by the mobile device in executing the task;
determine network configuration that is allocable to the mobile device;
estimate a second amount of resources that will be consumed by the mobile device when a computing node in a mobile computing environment executes the task under the network configuration;
determine that the task is to be executed by the mobile computing environment in response to the second amount being less than the first amount by a predefined threshold;
instruct the computing node in the mobile computing environment to execute the task; and
send a result of executing the task to the mobile device; and
wherein the processor is further configured to estimate first time consumption $T_1$ as the first amount based on processor configuration of the mobile device; and
wherein the processor is further configured to estimate second time consumption $T_2$ as the second amount based on time for sending the task to the mobile computing environment and delay time $T_{vm}$ for executing the task by the computing node in the mobile computing environment.

11. The apparatus according to claim 10, wherein the network configuration comprises:
modulation information M; and
the number c of channels.

12. The apparatus according to claim 11, wherein the processor is further configured to:

select candidate values from a plurality of candidate values of the modulation information M, in response to the second amount not being less than the first amount by the predefined threshold; and
a plurality of candidate values of the number c of channels, such that after selection the second amount is less than the first amount by the predefined threshold.

13. The apparatus according to claim 10, wherein the network configuration comprises:
modulation information M;
number c of channels; and
the second time consumption $T_2$ is estimated based on an equation $T_2 = 2T_{tx}(M,c) + T_{vm}$, wherein $T_{tx}(M,c)$ represents time for sending task under the network configuration (M,c), $$T_{tx}(M,c) = \frac{LT_s}{cl\log_2 M},$$

wherein L represents the number of bits of the task, $T_s$ and l are constants associated with a mobile environment where the mobile device is.

14. The apparatus according to claim 13, wherein the processor is further configured to:
estimate first energy consumption $P_1$ as the first amount based on processor frequency of the mobile device; and
estimate second energy consumption $P_2$ as the second amount based on standby power $P_c$ of the mobile device and sending power $P_T(M,c)$ for sending the task under the network configuration.

15. The apparatus according to claim 14, wherein
the first energy consumption $P_1$ is estimated based on an equation $P_1 = Kf^2$, wherein K is a constant, and f is the processor frequency of the mobile device; and
the second energy consumption $P_2$ is estimated based on a formula $P_2 = (P_c + P_T(M,c)) \cdot T_{tx}(M,c)$, wherein the sending power $$P_T(M,c) = \frac{cN_0 w(M-1)\ln(5p_e)}{-1.5g},$$

Pe is the maximum error probability, g is channel gain, and $N_0$ and w are constants associated with a mobile environment where the mobile device is.

16. The apparatus according to claim 10, wherein
the first amount is the maximum number of channels that are supported by a base station communicating with the mobile device; and
the second amount is the sum of the total number of channels that are allocated by the base station to all other mobile devices and the number c of channels.

17. The apparatus according to claim 10, wherein
the apparatus is implemented at a base station communicating with the mobile device.

18. The apparatus according to claim 10, wherein the processor is further comprising:
determine that the task is to be executed by the mobile device in response to the second amount not being less than the first amount by the predefined threshold.

* * * * *